(12) United States Patent
Jiang et al.

(10) Patent No.: US 11,416,719 B2
(45) Date of Patent: Aug. 16, 2022

(54) LOCALIZATION METHOD AND HELMET AND COMPUTER READABLE STORAGE MEDIUM USING THE SAME

(71) Applicant: UBTECH ROBOTICS CORP LTD, Shenzhen (CN)

(72) Inventors: Chenchen Jiang, Shenzhen (CN); Zhichao Liu, Shenzhen (CN); Yongsheng Zhao, Shenzhen (CN); Yu Tang, Shenzhen (CN); Jianxin Pang, Shenzhen (CN); Youjun Xiong, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 240 days.

(21) Appl. No.: 17/012,016

(22) Filed: Sep. 3, 2020

(65) Prior Publication Data
US 2021/0182633 A1 Jun. 17, 2021

(30) Foreign Application Priority Data
Dec. 14, 2019 (CN) .......................... 201911286923.7

(51) Int. Cl.
G06K 9/62 (2022.01)
G01S 19/47 (2010.01)
G01S 19/48 (2010.01)
G01S 19/49 (2010.01)

(52) U.S. Cl.
CPC ............ G06K 9/6288 (2013.01); G01S 19/47 (2013.01); G01S 19/485 (2020.05); G01S 19/49 (2013.01); G06K 9/6232 (2013.01)

(58) Field of Classification Search
CPC .... G06K 9/6288; G06K 9/6232; G01S 19/47; G01S 19/485; G01S 19/49
See application file for complete search history.

(56) References Cited

U.S. PATENT DOCUMENTS

2018/0284802 A1* 10/2018 Tsai ......................... G01S 5/16

FOREIGN PATENT DOCUMENTS

| CN | 104318559 A | 1/2015 |
|---|---|---|
| CN | 108955673 A | 12/2018 |
| CN | 109211241 A | 1/2019 |
| CN | 109816769 A | 5/2019 |

* cited by examiner

*Primary Examiner* — Casey L Kretzer

(57) ABSTRACT

The present disclosure provides a localization method as well as a helmet and a computer readable storage medium using the same. The method includes: extracting first feature points from a target image; obtaining inertial information of the carrier, and screening the first feature points based on the inertial information to obtain second feature points; triangulating the second feature points of the target image to generate corresponding initial three-dimensional map points, if the target image is a key frame image; performing a localization error loopback calibration on the initial three-dimensional map points according to at least a predetermined constraint condition to obtain target three-dimensional map points; and determining a positional point of the specific carrier according to the target three-dimensional map points. In this manner, the accuracy of the localization of a dynamic object such as a person when moving can be improved.

20 Claims, 11 Drawing Sheets

LOCALIZATION METHOD AND HELMET AND COMPUTER READABLE STORAGE MEDIUM USING THE SAME

CROSS REFERENCE TO RELATED APPLICATIONS

The present disclosure claims priority to Chinese Patent Application No. 201911286923.7, filed Dec. 14, 2019, which is hereby incorporated by reference herein as if set forth in its entirety.

BACKGROUND

1. Technical Field

The present disclosure relates to localization technology, and particularly to a localization method as well as a helmet and a computer readable storage medium using the same.

2. Description of Related Art

Visual odometer localization is a kind of localization technology that has currently been studied a lot, which is widely used, has low cost, and can provide rich image information for motion estimation. However, due to the limitations of hardware weight, the need to erect localization base stations in advance, and the object to be localized having to be moved fast, the accuracy of the current localization method using the visual odometer has been unable to meet the localization requirements of a dynamic object such as a person in dynamic scenarios such as fire fighting and adventure.

It should be noted that, the information disclosed above is only for facilitating the understanding of the background of the present disclosure, and therefore may include information that does not known to those of ordinary skill in the art.

BRIEF DESCRIPTION OF THE DRAWINGS

To describe the technical schemes in the embodiments of the present disclosure or in the prior art more clearly, the following briefly introduces the drawings required for describing the embodiments or the prior art. It should be understood that, the drawings in the following description merely show some embodiments of the present disclosure. For those skilled in the art, other drawings can be obtained according to the drawings without creative efforts.

DETAILED DESCRIPTION

In order to make the objects, features and advantages of the present disclosure more obvious and easy to understand, the technical solutions in the embodiments of the present disclosure will be clearly and completely described below with reference to the drawings. Apparently, the described embodiments are part of the embodiments of the present disclosure, not all of the embodiments. All other embodiments obtained by those skilled in the art based on the embodiments of the present disclosure without creative efforts are within the scope of the present disclosure.

It is to be understood that, when used in the description and the appended claims of the present disclosure, the terms "including" or ("comprising") indicate the presence of stated features, integers, steps, operations, elements and/or components, but do not preclude the presence or addition of one or a plurality of other features, integers, steps, operations, elements, components and/or combinations thereof.

It is also to be understood that, the terminology used in the description of the present disclosure is only for the purpose of describing particular embodiments and is not intended to limit the present disclosure. As used in the description and the appended claims of the present disclosure, the singular forms "one", "a", and "the" are intended to include the plural forms as well, unless the context clearly indicates otherwise.

It is also to be further understood that the term "and/or" used in the description and the appended claims of the present disclosure refers to any combination of one or more of the associated listed items and all possible combinations, and includes such combinations.

As used in the description and the appended claims, the term "if" may be interpreted as "when" or "once" or "in response to determining" or "in response to detecting" according to the context. Similarly, the phrase "if determined" or "if [the described condition or event] is detected" may be interpreted as "once determining" or "in response to determining" or "on detection of [the described condition or event]" or "in response to detecting [the described condition or event]".

In addition, in the present disclosure, the terms "first", "second", "third" and the like in the descriptions are only used for distinguishing, and cannot be understood as indicating or implying relative importance.

Figure 1:
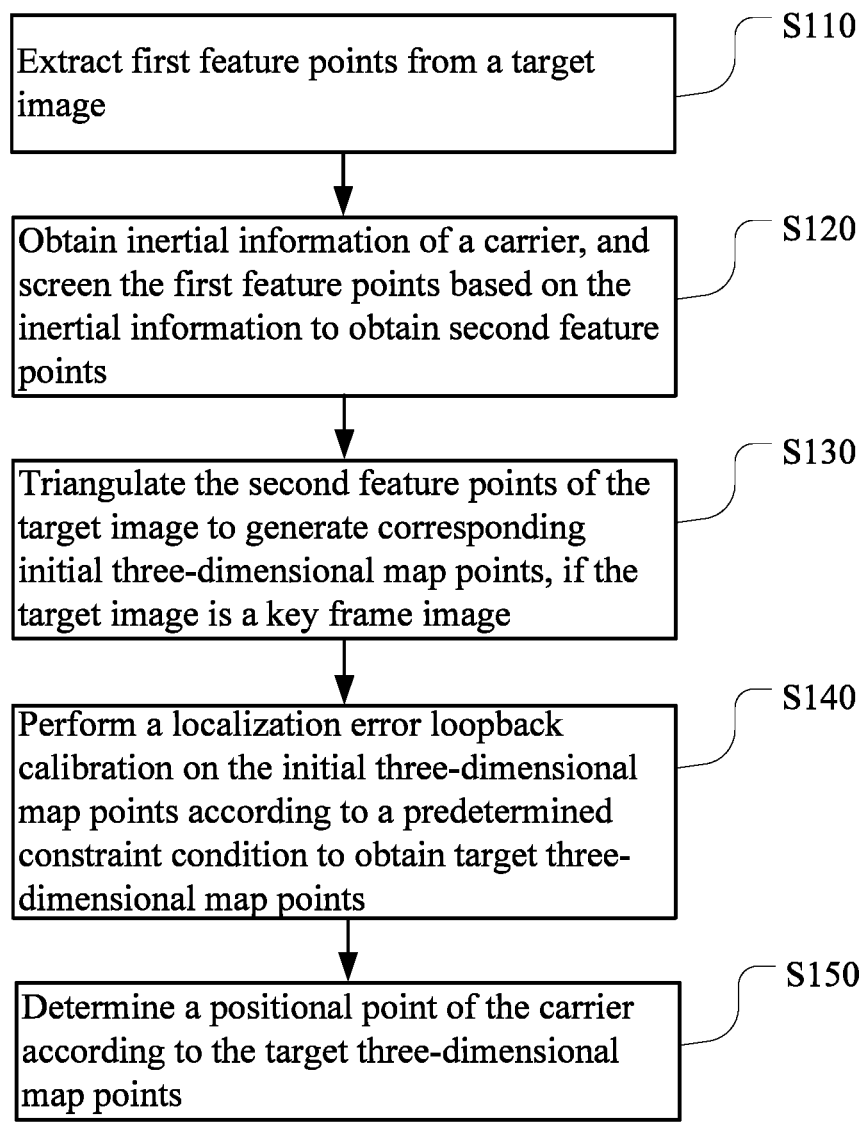
FIG. 1 is a flow chart of an embodiment of a localization method according to the present disclosure.

FIG. 1 is a flow chart of an embodiment of a localization method according to the present disclosure. In this embodiment, a localization method is provided. The method is a computer-implemented method executable for a processor, which is executed by a carrier, for example, a wearable or portable apparatus or device such as a helmet, which can be worn by a person who needs to be localized. In one embodiment, the method may be implemented through and applied to a localization apparatus shown in FIG. 7 or implemented through and applied to a helmet shown in FIG. 8. As shown in FIG. 1, the method includes the following steps.

S110: extracting first feature points from a target image;

S120: obtaining inertial information of the carrier, and screening the first feature points based on the inertial information to obtain second feature points;

S130: triangulating the second feature points of the target image to generate corresponding initial three-dimensional map points, if the target image is a key frame image;

S140: performing a localization error loopback calibration on the initial three-dimensional map points according to a predetermined constraint condition to obtain target three-dimensional map points; and S150: determining a positional point of the carrier according to the target three-dimensional map points.

The forgoing steps will be described in detail below.

In step S110, feature point extraction is performed on the obtained target image to obtain the first feature points. In this embodiment, the target image is obtained through a camera installed on the carrier.

Figure 2:
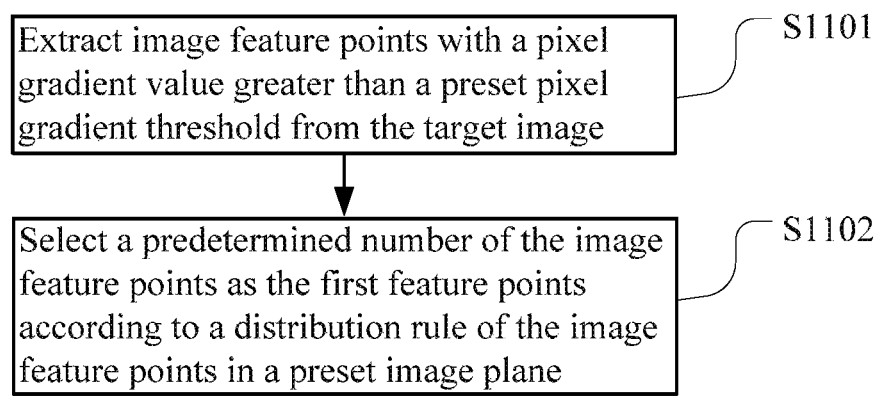
FIG. 2 is a flow chart of an example of step S110 of the method of the embodiment of FIG. 1.

FIG. 2 is a flow chart of an example of step S110 of the method of the embodiment of FIG. 1. As shown in FIG. 2, in one embodiment, step S110 can include the following steps.

S1101: extracting image feature points with a pixel gradient value greater than a preset pixel gradient threshold from the target image.

In which, the target image refers to an obtained image of the movement of a to-be-localized object at a specific moment. The image feature points refer to points in the image that has distinctive characteristics and can effectively reflect the essential characteristics of the image which can be used to identify a target object in the image, for example, edge contour points of the target object. The preset pixel gradient threshold can be set according to actual conditions, which is not limited herein.

In this embodiment, any method including the method in the prior art can be used to extract image feature points. For details, please refer to the details in the prior art, which is not limited herein.

S1102: selecting a predetermined number of the image feature points as the first feature points according to a distribution rule of the image feature points in a preset image plane.

In which, the distribution rule of the image feature points in the preset image plane refers to the spatial arrangement rule of the image feature points in the preset image plane. For example, in the case that the preset image plane is a two-dimensional image pixel coordinate system, a predetermined number of the image feature points are selected as the first feature points according to the relative orientation and distance between the image feature point and the origin of the coordinate. The number of the image feature points to be selected can be flexibly set according to the shape characteristics of the to-be-localized object, different localization scenes, and different localization accuracy requirements.

In this manner, it has the advantage that the feature points of the captured image can be accurately identified in the environment of the to-be-localized object to be moved, which improves the accuracy of the extraction of the image feature points.

In step S120, the inertial information of the carrier is obtained, and the first feature points are screened based on the inertial information to obtain second feature points.

In which, the inertial information refers to acceleration information and rotational angle information of the carrier at a specific moment that is obtained by an inertial measurement unit (IMU).

Figure 3:
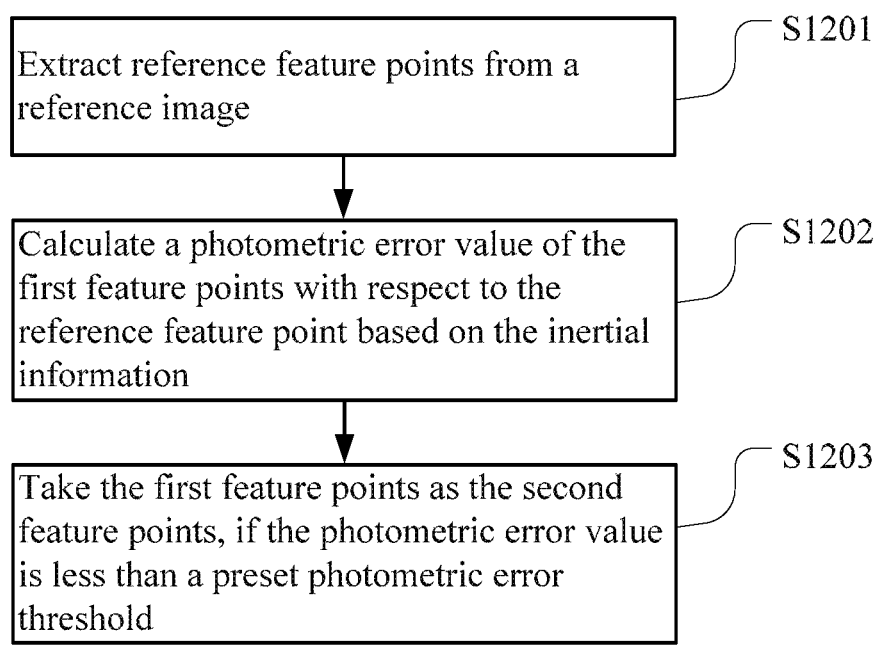
FIG. 3 is a flow chart of an example of step S120 of the method of the embodiment of FIG. 1.

FIG. 3 is a flow chart of an example of step S120 of the method of the embodiment of FIG. 1. As shown in FIG. 3, in one embodiment, step S120 can include the following steps.

S1201: extracting reference feature points from a reference image.

It should be noted that, the reference image is related to the target image. For example, in the case that the target image is an image obtained at moment t, the reference image can be an image obtained at moment t−1. Which one of the images with different time interval with respect to the target image is to be selected as the reference image can be determined according to actual conditions.

For the process of extracting feature points from the reference image, refer to step S110.

S1202: calculating a photometric error value of the first feature points with respect to the reference feature point based on the inertial information.

In this embodiment, based on the inertial information, the photometric value of the first feature points at the moment when obtaining the reference image feature point can be calculated by integrating, and the difference between the photometric value and the photometric value of the known reference feature point can be calculated to obtain the photometric error value.

S1203: taking the first feature points as the second feature points, if the photometric error value is less than a preset photometric error threshold.

In which, the preset photometric error threshold can be set according to actual conditions. For example, on a sunny day, the photometric error threshold can be set to a smaller value; and on a rainy day, the photometric error threshold can be set to a larger value.

In this manner, it has the advantage that the invalidity of the selected image feature points in the environment of changing luminosity can be avoided, which improves the accuracy of the selection of the image feature points.

In step S130, if the target image is the key frame image, the second feature points of a key frame image are triangulated to generate the corresponding initial three-dimensional map points.

In which, the key frame image refers to an image essential for determining the moving distance and moving direction of the to-be-localized object, for example, an image with the moving distance of the to-be-localized object exceeding a preset fixed value.

By triangulating the second feature points of these key images, a spatial point cloud is formed. Then, based on information of the spatial point cloud, the initial three-dimensional map points of each second feature point is generated, and the initial three-dimensional map points are spliced into an initial three-dimensional map. The spatial point cloud includes three-dimensional coordinate information (x,y,z) and color information (R,G,B) of the feature points.

Step S140: the localization error loopback calibration is performed on the initial three-dimensional map points according to the predetermined constraint condition to obtain target three-dimensional map points.

When the new target image is obtained, it is necessary to determine whether the target image has already appeared in the previous image sequence. Generally, the similarity between the extracted second feature points of the target image and the second feature points of the previous reference key frame image can be calculated to determine whether the target image has already appeared in the previous image sequence. If the result of the calculation shows that the similarity between the two is larger than a certain threshold, it can generally be considered that the two are duplicated and the current target image needs to be discarded.

In one embodiment, k of the first n key frame images are randomly selected and each of them is matched with the new target image in pairs. If there is a match, it considers that there is a loopback, the current target image is discarded and the point cloud corresponding to the second feature points of the target image is deleted from the initial three-dimensional map.

In this manner, it has the advantage that invalid point clouds can be prevented from being displayed in the three-dimensional map, thereby improving the accuracy of the localization of dynamic objects.

It should be noted that, after the loopback detection, there are no invalid three-dimensional image points in the initial three-dimensional map, so that the entire three-dimensional map contains only the target three-dimensional map points.

Step S150: the positional point of the carrier is determined according to the target three-dimensional map points.

Figure 4:
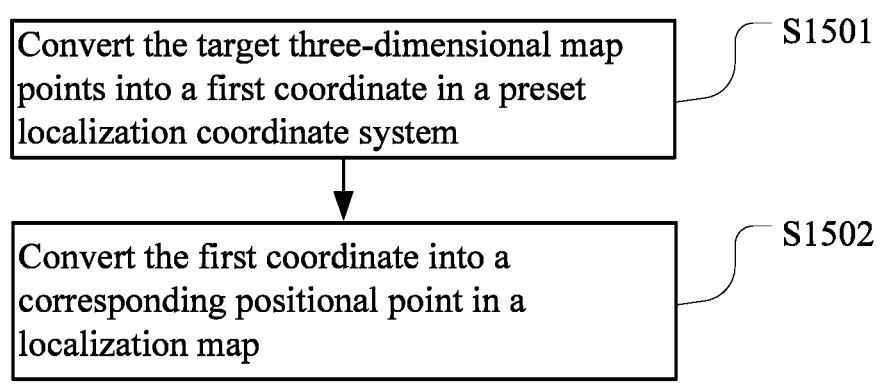
FIG. 4 is a flow chart of an example of step S150 of the method of the embodiment of FIG. 1.

FIG. 4 is a flow chart of an example of step S150 of the method of the embodiment of FIG. 1. As shown in FIG. 4, in one embodiment, step S150 can include the following steps.

S1501: converting the target three-dimensional map points into a first coordinate in a preset localization coordinate system.

In which, the preset localization coordinate system can be any one of the GCJ-02 coordinate system, the WGS-84 coordinate system, the CGCS2000 coordinate system, and the BD-09 coordinate system.

S1502: converting the first coordinate into a corresponding positional point in a localization map.

In this embodiment, by converting the first coordinates into the corresponding positional points in the localization map, it will be convenient for the to-be-localized object to determine its own position, and will be also convenient for the monitoring personnel to perform real-time localization and monitoring on the to-be-localized object.

Figure 5:
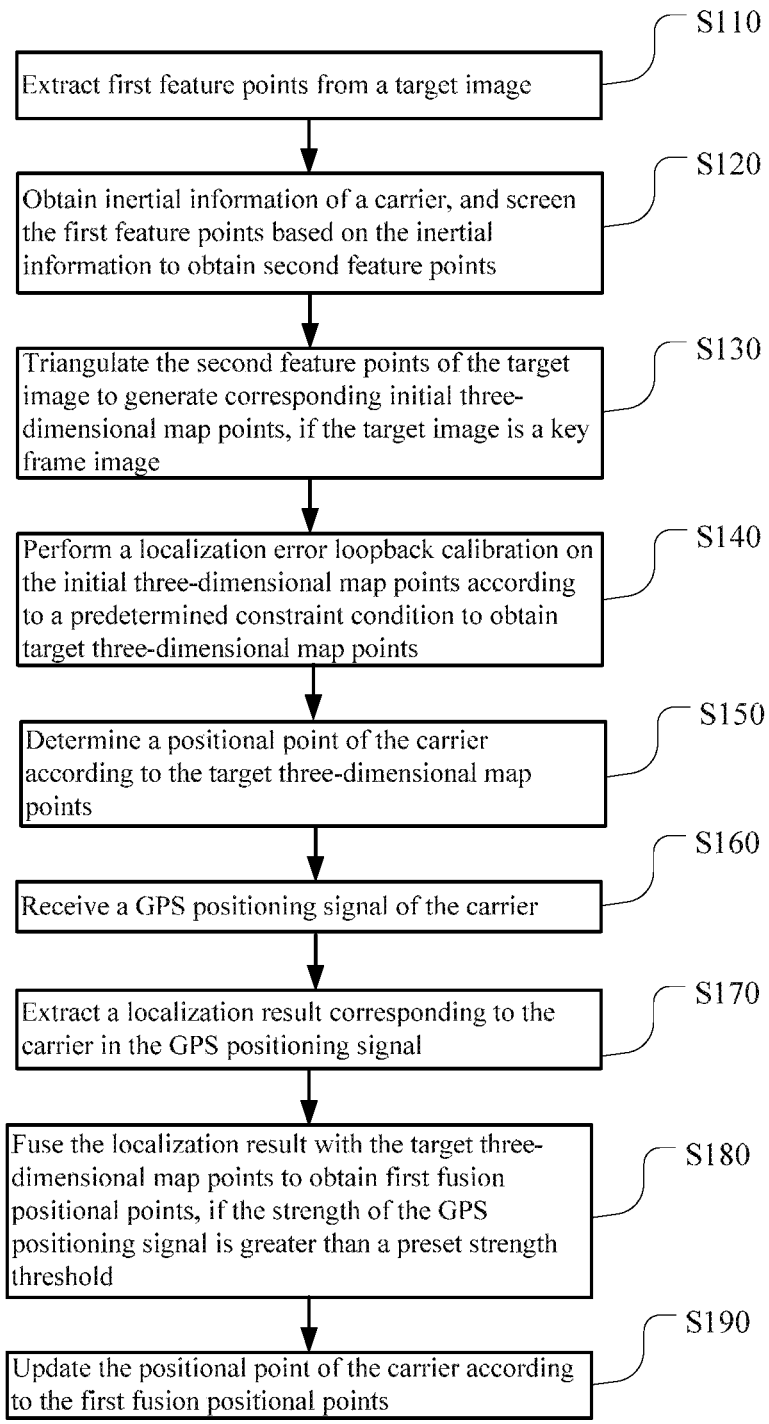
FIG. 5 is a flow chart of another embodiment of a localization method according to the present disclosure.

FIG. 5 is a flow chart of another embodiment of a localization method according to the present disclosure. As shown in FIG. 5, in another embodiment, after step S150, the method further includes the following steps.

S160: receiving a GPS positioning signal of the carrier;

S170: extracting a localization result corresponding to the carrier in the GPS positioning signal;

S180: fusing the localization result with the target three-dimensional map points to obtain first fusion positional points, if the strength of the GPS positioning signal is greater than a preset strength threshold; and S190: updating the positional point of the carrier according to the first fusion positional points.

The forgoing steps will be described in detail below.

In step S160, the GPS positioning signal of the carrier is received.

Generally, a GPS positioning signal receiver can be installed on the carrier for receiving GPS positioning signals in real time.

In step S170, the localization result corresponding to the carrier that is in the GPS positioning signal is extracted.

In which, the GPS positioning signal includes the localization result corresponding to the carrier. The localization result can be an absolute localization result such as latitude and longitude. In other embodiment, the localization result can also be a relative localization result such as the orientation and distance with respect to a fixed point.

In step S180, of the strength of the GPS positioning signal is greater than the preset strength threshold, the localization result is fused with the target three-dimensional map points to obtain the first fusion positional points.

It should be noted that, in an urban environment with tall buildings or an outdoor environments with large mountains, the strength of the GPS positioning signal may be weak, which results in a large error in the localization result. Therefore, a GPS signal strength threshold can be determined in advance according to the localization accuracy required by the localization method. When the strength of the GPS positioning signal is greater than the preset strength threshold, the localization result and the target three-dimensional map points are fused to obtain the first fusion positional points. The fusion method can be set according to the actual conditions, which can include but is not limited to fuse using the Kalman filter algorithm.

In step S190, the positional point of the carrier is updated according to the first fusion positional points.

In this embodiment, by updating the positional point of the carrier according to the first fusion positional points, it will be convenient for the to-be-localized object to determine its own position in real time, and will be also convenient for the monitoring personnel to obtain the precise position of the to-be-localized object in real time.

Figure 6:
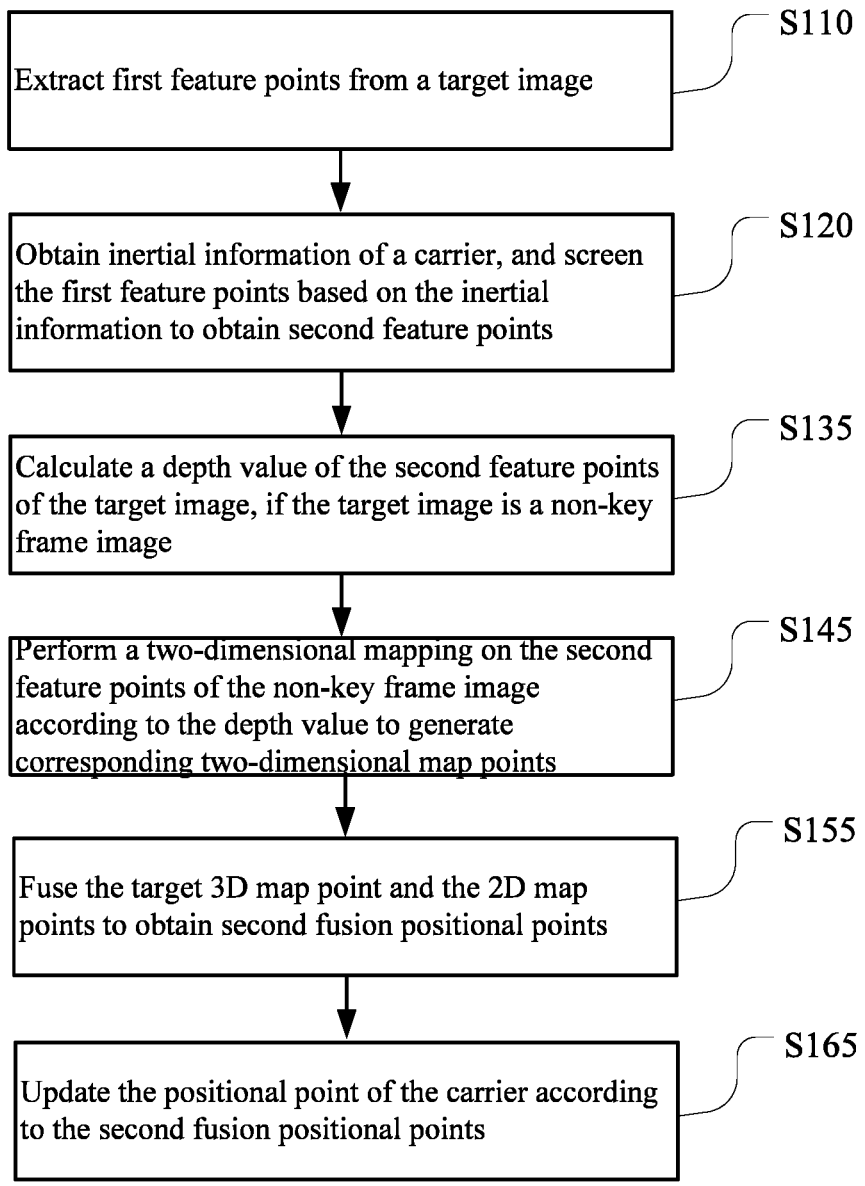
FIG. 6 is a flow chart of the other embodiment of a localization method according to the present disclosure.

FIG. 6 is a flow chart of the other embodiment of a localization method according to the present disclosure. As shown in FIG. 6, in another embodiment, after step S120, the method further includes the following steps.

S135: calculating a depth value of the second feature points of the target image, if the target image is a non-key frame image.

The non-key frame image refers to an image that is not important for determining the moving distance and moving direction of the to-be-localized object in comparison with the key frame image. The depth value of the second feature point refers to the distance from the second feature point of the non-key frame image to the plane where the center of the camera is located that is determined based on the second feature points. The method for calculating the image depth includes photometric stereo vision method, multi-view stereo method, and the like, which is not limited herein.

S145: performing a two-dimensional mapping on the second feature points of the non-key frame image according to the depth value to generate corresponding two-dimensional map points.

In which, the two-dimensional mapping refers to converting the second feature points of the non-key frame image into map points on a two-dimensional planar map. At the same time, the various parameters of the display of the two-dimensional map points are adjusted according to a relationship table of the depth values and the two-dimensional map points that is created in advance.

S155: fusing the target 3D map point and the 2D map points to obtain second fusion positional points.

In this embodiment, by fusing the target 3D map point and the 2D map points, the fused position can better reflect the true position of the to-be-localized object.

S165: updating the positional point of the carrier according to the second fusion positional points.

In this embodiment, by updating the positional point of the carrier according to the second fusion positional points, it will be convenient for the to-be-localized object to determine its own position in real time, and it will be also convenient for the monitoring personnel to obtain the precise position of the to-be-localized object in real time.

In one embodiment, after step S150, the method further includes:

transmitting the positional point of the carrier to a predetermined receiving terminal, so that the predetermined receiving terminal determines the position of the carrier according to the positional point of the carrier.

In which, the predetermined receiving terminal can be a network device such as a mobile terminal and a server, which is not limited herein. By transmitting the positional point of the carrier to the predetermined receiving terminal, in scenes such as fire fighting and special police duty, other personnel can monitor the position of relevant personnel in the scene in real time to facilitate works.

In summary, compared with the prior art, the beneficial effects of the localization method of this embodiment are realized by first extracting first feature points from a target image; obtaining inertial information of the carrier, and screening the first feature points based on the inertial information to obtain second feature points; triangulating the second feature points of the target image to generate corresponding initial three-dimensional map points, if the target image is a key frame image; performing a localization error loopback calibration on the initial three-dimensional map points according to a predetermined constraint condition to obtain target three-dimensional map points; and finally determining a positional point of the specific carrier according to the target three-dimensional map points. Through the localization method of this embodiment, when a dynamic object such as a person is moving, by obtaining an image of the moving of the dynamic object and performing feature point extraction and screening, the trajectory of the moving of the dynamic object can be identified, and then by triangulating the key frame images in the obtained moving image to generate the initial 3D map points to perform the localization error loopback calibration so as to obtain the accurate target 3D map points corresponding to each second feature point, and finally the target 3D map points are converted to the precise positional points in a specific localization scene map. In this way, the localization accuracy of a dynamic object such as a person when moving can be greatly improved.

Figure 7:
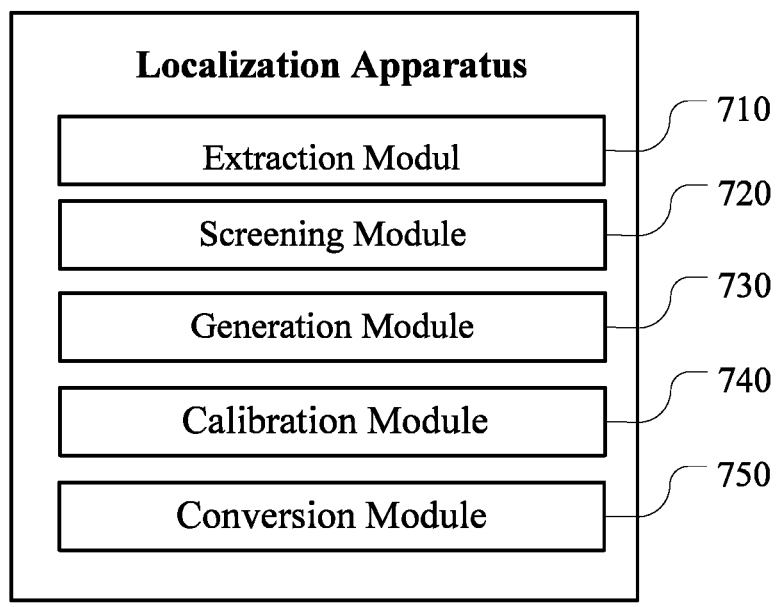
FIG. 7 is a schematic block diagram of an embodiment of a localization apparatus according to the present disclosure.

FIG. 7 is a schematic block diagram of an embodiment of a localization apparatus according to the present disclosure. In this embodiment, a localization apparatus is provided. The apparatus may be applied to a helmet shown in FIG. 8. As shown in FIG. 7, the localization apparatus can include:

an extraction module 710 configured to extract first feature points from a target image;

a screening module 720 configured to obtain inertial information of the carrier, and screen the first feature points based on the inertial information to obtain second feature points;

a generation module 730 configured to triangulate the second feature points of the target image to generate corresponding initial three-dimensional map points, in response to the target image being a key frame image;

a calibration module 740 configured to perform a localization error loopback calibration on the initial three-dimensional map points according to a predetermined constraint condition to obtain target three-dimensional map points; and a conversion module 750 configured to determine a positional point of the specific carrier according to the target three-dimensional map points.

In one embodiment, the extraction module 710 may include:

a first extraction subunit configured to extract image feature points with a pixel gradient value greater than a preset pixel gradient threshold from the target image; and a first selection subunit configured to select a predetermined number of the image feature points as the first feature points according to a distribution rule of the image feature points in a preset image plane.

In one embodiment, the screening module 720 may include:

a second extraction subunit configured to extract reference feature points from a reference image;

a first calculation subunit configured to calculate a photometric error value of the first feature points with respect to the reference feature point based on the inertial information; and a second selection subunit configured to take the first feature points as the second feature points, in response to the photometric error value being less than a preset photometric error threshold.

In one embodiment, the conversion module 750 may include:

a first conversion subunit configured to convert the target three-dimensional map points into a first coordinate in a preset localization coordinate system; and a second conversion subunit configured to convert the first coordinate into a corresponding positional point in a localization map.

In this embodiment, each of the above-mentioned modules/subunits is implemented in the form of software, which can be computer program(s) stored in a memory of the localization apparatus and executable on a processor of the localization apparatus. In other embodiments, each of the above-mentioned modules/subunits may be implemented in the form of hardware (e.g., a circuit of the localization apparatus which is coupled to the processor of the localization apparatus) or a combination of hardware and software (e.g., a circuit with a single chip microcomputer).

Those skilled in the art can clearly understand that, for the convenience and conciseness of the description, the specific working processes of the above-mentioned apparatus, modules and subunits can refer to the corresponding processes in the foregoing method embodiments, which will not be repeated herein.

It should be understood that, the sequence of the serial number of the steps in each of the above-mentioned embodiments does not mean the execution order while the execution order of each process should be determined by its function and internal logic, which should not be taken as any limitation to the implementation process of the embodiments.

Figure 8:
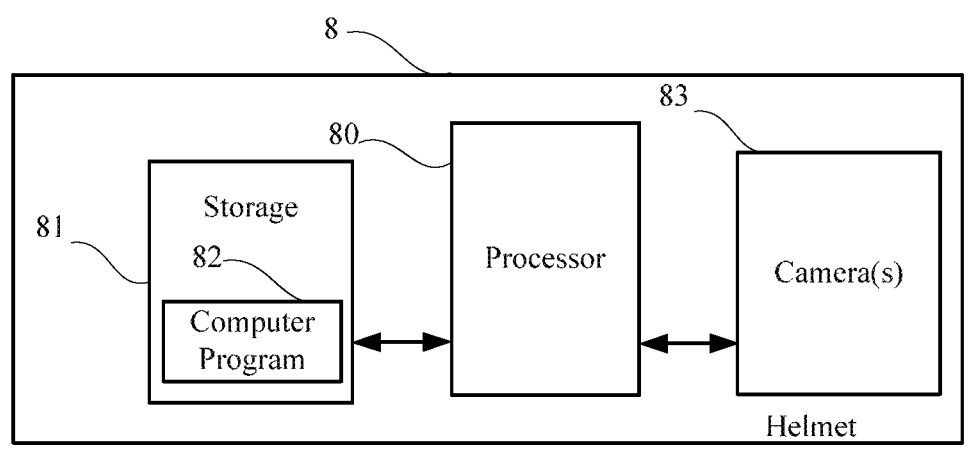
FIG. 8 is a schematic block diagram of an embodiment of a helmet according to the present disclosure.

FIG. 8 is a schematic block diagram of an embodiment of a helmet according to the present disclosure. In this embodiment, a helmet 8 is provided. As shown in FIG. 8, in this embodiment, the helmet 8 includes a processor 80, a storage 81, a computer program 82 stored in the storage 81 and executable on the processor 80, and camera(s) 83. When executing (instructions in) the computer program 82, the processor 80 implements the steps in the above-mentioned embodiments of the localization method, for example, steps S110-S150 shown in FIG. 1. Alternatively, when the processor 80 executes the (instructions in) computer program 82, the functions of each module/unit in the above-mentioned device embodiments, for example, the functions of the modules 710-750 shown in FIG. 7 are implemented.

Exemplarily, the computer program 82 may be divided into one or more modules/units, and the one or more modules/units are stored in the storage 81 and executed by the processor 80 to realize the present disclosure. The one or more modules/units may be a series of computer program instruction sections capable of performing a specific function, and the instruction sections are for describing the execution process of the computer program 82 in the helmet 8.

The helmet 8 may include, but is not limited to, the processor 80 and the storage 81. It can be understood by those skilled in the art that FIG. 8 is merely an example of the helmet 8 and does not constitute a limitation on the helmet 8, and may include more or fewer components than those shown in the figure, or a combination of some components or different components. For example, the helmet 8 may further include an input/output device, power supply, a network access device, a bus, and the like.

The processor 80 may be a central processing unit (CPU), or be other general purpose processor, a digital signal processor (DSP), an application specific integrated circuit (ASIC), a field-programmable gate array (FPGA), or be other programmable logic device, a discrete gate, a transistor logic device, and a discrete hardware component. The general purpose processor may be a microprocessor, or the processor may also be any conventional processor.

The storage 81 may be an internal storage unit of the helmet 8, for example, a hard disk or a memory of the helmet 8. The storage 81 may also be an external storage device of the helmet 8, for example, a plug-in hard disk, a smart media card (SMC), a secure digital (SD) card, flash card, and the like, which is equipped on the helmet 8. Furthermore, the storage 81 may further include both an internal storage unit and an external storage device, of the helmet 8. The storage 81 is configured to store the computer program 82 and other programs and data required by the helmet 8. The storage 81 may also be used to temporarily store data that has been or will be output.

Figure 9:
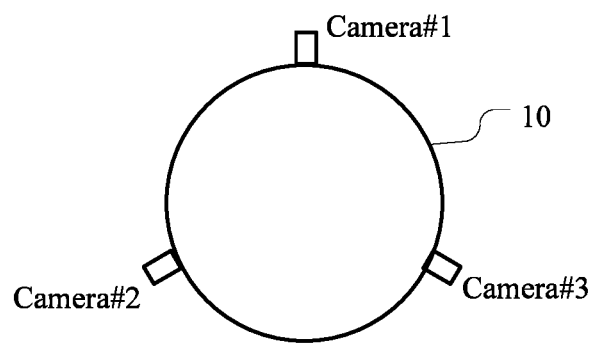
FIG. 9 is a schematic diagram of an example of disposing three cameras on the helmet of FIG. 8.

FIG. 9 is a schematic diagram of an example of disposing three cameras on the helmet of FIG. 8. As shown in FIG. 9 of the top view of the helmet 8, in one embodiment, three cameras 83 can be disposed on the helmet 8 of FIG. 8. It can be seen that the three cameras 83, that is, camera #1, camera #2, and camera #3 are evenly distributed on the helmet 8 at equal intervals or equal angles. For example, the three cameras 83 can be disposed at the front, the rear left, and the rear right of the helmet 8. In which, camera #1 is disposed at the front of the helmet 8, which has lens facing the right front so as to collect image data of the front of the helmet 8; camera #2 is disposed at the rear left of the helmet 8, which has lens with the orientation that can be obtained by rotating the lens of camera #1 by 120° counterclockwise so as to collect image data of the rear left of the helmet 8; and camera #3 is disposed at the rear right of the helmet 8, which has lens with the orientation that can be obtained by rotating the lens of camera #1 by 120° clockwise so as to collect image data of the rear right of the helmet 8. In other embodiments, the three cameras 83 can also be disposed unevenly on the helmet 8, for example, the three cameras 83 can be separated by different intervals or different angles.

Figure 10:
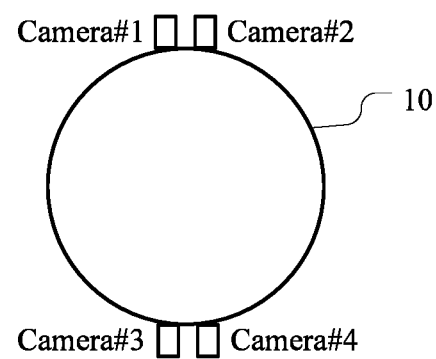
FIG. 10 is a schematic diagram of an example of disposing binocular camera modules on the helmet of FIG. 8.

FIG. 10 is a schematic diagram of an example of disposing binocular camera modules on the helmet of FIG. 8. As shown in FIG. 10 of the top view of the helmet 8, in one embodiment, four cameras 83 which form two binocular camera modules can be disposed on the helmet 8 of FIG. 8. The two binocular camera modules are denoted as a first binocular camera module and a second binocular camera module. It can be seen that the four cameras 83 include camera #1, camera #2, camera #3, and camera #4, where the first binocular camera module including camera #1 and camera #2 is disposed at the front of the helmet 8, which has lenses all facing the front so as to collect image data of the front of the helmet 8, and the second binocular camera module including camera #3 and camera #4 is disposed at the rear of the helmet 8, which has lenses all facing the rear so as to collect image data of the rear of the helmet 8. In other embodiments, five cameras 83 which include the two binocular camera modules and one additional camera 83 (i.e., camera #5, which is not shown in the figure) can be disposed on the helmet 8 of FIG. 8. In which, camera #5 can be disposed on the top of the helmet 8, which has lens facing the right above so as to collect image data of the above of the helmet 8.

Figure 11:
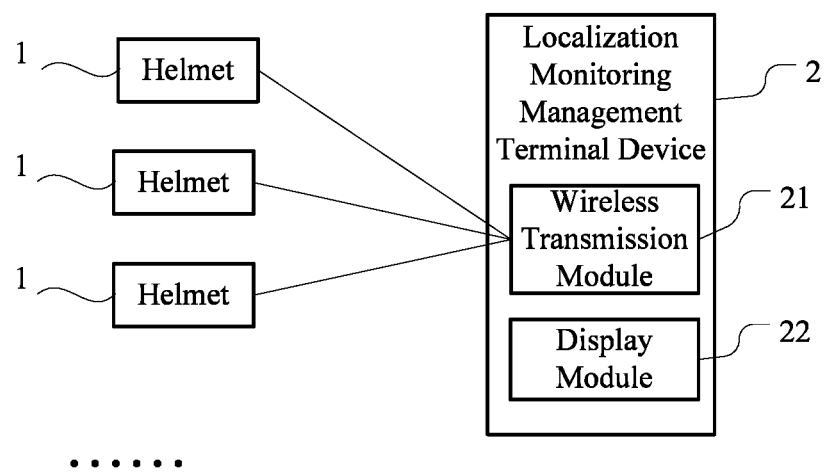
FIG. 11 is a schematic block diagram of an embodiment of a localization monitoring management system according to the present disclosure.

FIG. 11 is a schematic block diagram of an embodiment of a localization monitoring management system according to the present disclosure. In this embodiment, a localization monitoring management system is provided. The localization monitoring management system can include a localization monitoring management terminal device 2 and a plurality of helmets 1. The helmet 1 can be the above-mentioned helmet 8. As shown in FIG. 11, the localization monitoring management terminal device 2 can include a wireless transmission module 21 and a display module 22. The wireless transmission module 21 of the localization monitoring management terminal device 2 is configured to receive localization information of each helmet 1 (i.e., localization information transmitted by a wireless transmission module of each helmet 1), and can transmit communication instructions to the helmets 1 or users wearing the helmets 1 according to the localization information, so as to issue real-time dispatch or danger notification instructions according to actual conditions.

Those skilled in the art may clearly understand that, for the convenience and simplicity of description, the division of the above-mentioned functional units and modules is merely an example for illustration. In actual applications, the above-mentioned functions may be allocated to be performed by different functional units according to requirements, that is, the internal structure of the device may be divided into different functional units or modules to complete all or part of the above-mentioned functions. The functional units and modules in the embodiments may be integrated in one processing unit, or each unit may exist alone physically, or two or more units may be integrated in one unit. The above-mentioned integrated unit may be implemented in the form of hardware or in the form of software functional unit. In addition, the specific name of each functional unit and module is merely for the convenience of distinguishing each other and are not intended to limit the scope of protection of the present disclosure. For the specific operation process of the units and modules in the above-mentioned system, reference may be made to the corresponding processes in the above-mentioned method embodiments, and are not described herein.

In the above-mentioned embodiments, the description of each embodiment has its focuses, and the parts which are not described or mentioned in one embodiment may refer to the related descriptions in other embodiments.

Those ordinary skilled in the art may clearly understand that, the exemplificative units and steps described in the embodiments disclosed herein may be implemented through electronic hardware or a combination of computer software and electronic hardware. Whether these functions are implemented through hardware or software depends on the specific application and design constraints of the technical schemes. Those ordinary skilled in the art may implement the described functions in different manners for each particular application, while such implementation should not be considered as beyond the scope of the present disclosure.

In the embodiments provided by the present disclosure, it should be understood that the disclosed apparatus (or device)/helmet and method may be implemented in other manners. For example, the above-mentioned apparatus/helmet embodiment is merely exemplary. For example, the division of modules or units is merely a logical functional division, and other division manner may be used in actual implementations, that is, multiple units or components may be combined or be integrated into another system, or some of the features may be ignored or not performed. In addition, the shown or discussed mutual coupling may be direct coupling or communication connection, and may also be indirect coupling or communication connection through some interfaces, devices or units, and may also be electrical, mechanical or other forms.

The units described as separate components may or may not be physically separated. The components represented as units may or may not be physical units, that is, may be located in one place or be distributed to multiple network units. Some or all of the units may be selected according to actual needs to achieve the objectives of this embodiment.

In addition, each functional unit in each of the embodiments of the present disclosure may be integrated into one processing unit, or each unit may exist alone physically, or two or more units may be integrated in one unit. The above-mentioned integrated unit may be implemented in the form of hardware or in the form of software functional unit.

When the integrated module/unit is implemented in the form of a software functional unit and is sold or used as an independent product, the integrated module/unit may be stored in a non-transitory computer-readable storage medium. Based on this understanding, all or part of the processes in the method for implementing the above-mentioned embodiments of the present disclosure are implemented, and may also be implemented by instructing relevant hardware through a computer program. The computer program may be stored in a non-transitory computer-readable storage medium, which may implement the steps of each of the above-mentioned method embodiments when executed by a processor. In which, the computer program includes computer program codes which may be the form of source codes, object codes, executable files, certain intermediate, and the like. The computer-readable medium may include any primitive or device capable of carrying the computer program codes, a recording medium, a USB flash drive, a portable hard disk, a magnetic disk, an optical disk, a computer memory, a read-only memory (ROM), a random access memory (RAM), electric carrier signals, telecommunication signals and software distribution media. It should be noted that the content contained in the computer readable medium may be appropriately increased or decreased according to the requirements of legislation and patent practice in the jurisdiction. For example, in some jurisdictions, according to the legislation and patent practice, a computer readable medium does not include electric carrier signals and telecommunication signals.

The above-mentioned embodiments are merely intended for describing but not for limiting the technical schemes of the present disclosure. Although the present disclosure is described in detail with reference to the above-mentioned embodiments, it should be understood by those skilled in the art that, the technical schemes in each of the above-mentioned embodiments may still be modified, or some of the technical features may be equivalently replaced, while these modifications or replacements do not make the essence of the corresponding technical schemes depart from the spirit and scope of the technical schemes of each of the embodiments of the present disclosure, and should be included within the scope of the present disclosure.

What is claimed is:

1. A computer-implemented localization method for a carrier, comprising steps of:
   extracting first feature points from a target image;
   obtaining inertial information of the carrier, and screening the first feature points based on the inertial information to obtain second feature points;
   triangulating the second feature points of the target image to generate corresponding initial three-dimensional map points, in response to the target image being a key frame image;
   performing a localization error loopback calibration on the initial three-dimensional map points according to at least a predetermined constraint condition to obtain target three-dimensional map points; and
   determining a positional point of the carrier according to the target three-dimensional map points.

2. The method of claim 1, wherein after the step of determining the positional point of the carrier according to the target three-dimensional map points further comprises steps of:
   receiving a GPS positioning signal of the carrier;
   extracting a localization result corresponding to the carrier in the GPS positioning signal;
   fusing the localization result with the target three-dimensional map points to obtain first fusion positional points, in response to the strength of the GPS positioning signal being greater than a preset strength threshold; and
   updating the positional point of the carrier according to the first fusion positional points.

3. The method of claim 1, wherein the step of extracting the first feature points from the target image comprises:
   extracting image feature points with a pixel gradient value greater than a preset pixel gradient threshold from the target image; and
   selecting a predetermined number of the image feature points as the first feature points according to a distribution rule of the image feature points in a preset image plane.

4. The method of claim 1, wherein the step of screening the first feature points based on the inertial information to obtain the second feature points comprises:
   extracting reference feature points from a reference image;
   calculating a photometric error value of the first feature points with respect to the reference feature point based on the inertial information; and
   taking the first feature points as the second feature points, in response to the photometric error value being less than a preset photometric error threshold.

5. The method of claim 1, further comprising steps of:
   calculating a depth value of the second feature points of the target image, in response to the target image being a non-key frame image;
   performing a two-dimensional mapping on the second feature points of the non-key frame image according to the depth value to generate corresponding two-dimensional map points;
   fusing the target 3D map point and the 2D map points to obtain second fusion positional points; and
   updating the positional point of the carrier according to the second fusion positional points.

6. The method of claim 1, wherein the step of determining the positional point of the carrier according to the target three-dimensional map points comprises:
converting the target three-dimensional map points into a first coordinate in a preset localization coordinate system; and
converting the first coordinate into a corresponding positional point in a localization map.

7. The method of claim 1, wherein after the step of determining the positional point of the carrier according to the target three-dimensional map points further comprises steps of:
transmitting the positional point of the carrier to a predetermined receiving terminal, so that the predetermined receiving terminal determines the position of the carrier according to the positional point of the carrier.

8. The method of claim 1, wherein the target image is obtained through a camera.

9. The method of claim 1, wherein the carrier is a helmet.

10. A helmet, comprising:
a memory;
a processor; and
one or more computer programs stored in the memory and executable on the processor, wherein the one or more computer programs comprise:
instructions for extracting first feature points from a target image;
instructions for obtaining inertial information of the helmet, and screening the first feature points based on the inertial information to obtain second feature points;
instructions for triangulating the second feature points of the target image to generate corresponding initial three-dimensional map points, in response to the target image being a key frame image;
instructions for performing a localization error loopback calibration on the initial three-dimensional map points according to at least a predetermined constraint condition to obtain target three-dimensional map points; and
instructions for determining a positional point of the helmet according to the target three-dimensional map points.

11. The helmet of claim 10, wherein the one or more computer programs further comprise:
instructions for receiving a GPS positioning signal of the helmet;
instructions for extracting a localization result corresponding to the helmet in the GPS positioning signal;
instructions for fusing the localization result with the target three-dimensional map points to obtain first fusion positional points, in response to the strength of the GPS positioning signal being greater than a preset strength threshold; and
instructions for updating the positional point of the helmet according to the first fusion positional points.

12. The helmet of claim 10, wherein the instructions for extracting the first feature points from the target image comprise:
instructions for extracting image feature points with a pixel gradient value greater than a preset pixel gradient threshold from the target image; and
instructions for selecting a predetermined number of the image feature points as the first feature points according to a distribution rule of the image feature points in a preset image plane.

13. The helmet of claim 10, wherein the instructions for screening the first feature points based on the inertial information to obtain the second feature points comprise:
instructions for extracting reference feature points from a reference image;
instructions for calculating a photometric error value of the first feature points with respect to the reference feature point based on the inertial information; and
instructions for taking the first feature points as the second feature points, in response to the photometric error value being less than a preset photometric error threshold.

14. The helmet of claim 10, wherein the one or more computer programs further comprise:
instructions for calculating a depth value of the second feature points of the target image, in response to the target image being a non-key frame image;
instructions for performing a two-dimensional mapping on the second feature points of the non-key frame image according to the depth value to generate corresponding two-dimensional map points;
instructions for fusing the target 3D map point and the 2D map points to obtain second fusion positional points; and
instructions for updating the positional point of the carrier helmet according to the second fusion positional points.

15. The helmet of claim 10, wherein the instructions for determining the positional point of the helmet according to the target three-dimensional map points comprise:
instructions for converting the target three-dimensional map points into a first coordinate in a preset localization coordinate system; and
instructions for converting the first coordinate into a corresponding positional point in a localization map.

16. The helmet of claim 10, wherein the one or more computer programs further comprise:
instructions for transmitting the positional point of the helmet to a predetermined receiving terminal, so that the predetermined receiving terminal determines the position of the helmet according to the positional point of the helmet.

17. A non-transitory computer readable storage medium storing instructions executable on a processor, and the instructions comprise:
instructions for extracting first feature points from a target image
instructions for obtaining inertial information of a carrier, and screening the first feature points based on the inertial information to obtain second feature points;
instructions for triangulating the second feature points of the target image to generate corresponding initial three-dimensional map points, in response to the target image being a key frame image;
instructions for performing a localization error loopback calibration on the initial three-dimensional map points according to at least a predetermined constraint condition to obtain target three-dimensional map points; and
instructions for determining a positional point of the carrier according to the target three-dimensional map points.

18. The storage medium of claim 17, wherein the instructions further comprise:
instructions for receiving a GPS positioning signal of the carrier;
instructions for extracting a localization result corresponding to the carrier in the GPS positioning signal;
instructions for fusing the localization result with the target three-dimensional map points to obtain first fusion positional points, in response to the strength of the GPS positioning signal being greater than a preset strength threshold; and instructions for updating the positional point of the carrier according to the first fusion positional points.

19. The storage medium of claim 17, wherein the instructions for extracting the first feature points from the target image comprise:

instructions for extracting image feature points with a pixel gradient value greater than a preset pixel gradient threshold from the target image; and instructions for selecting a predetermined number of the image feature points as the first feature points according to a distribution rule of the image feature points in a preset image plane.

20. The storage medium of claim 17, wherein the instructions for screening the first feature points based on the inertial information to obtain the second feature points comprise instructions for extracting reference feature points from a reference image;

instructions for calculating a photometric error value of the first feature points with respect to the reference feature point based on the inertial information; and instructions for taking the first feature points as the second feature points, in response to the photometric error value being less than a preset photometric error threshold.

\* \* \* \* \*